United States Patent Office 2,862,924
Patented Dec. 2, 1958

2,862,924

21-FURFURYLIDENE AND 21-THENYLIDENE DERIVATIVES OF PROGESTERONE AND 19-NOR-PROGESTERONE

Raymond M. Dodson, Park Ridge, Ill., assignor to G. D. Searle & Co., Chicago, Ill., a corporation of Delaware No Drawing. Application April 12, 1956
Serial No. 577,646

5 Claims. (Cl. 260—239.5)

My invention relates to a new group of heterocyclic derivatives of diketosteroids and, more particularly, to the 21-furfurylidene and 21-thenylidene derivatives of progesterone and 19-norprogesterone. The compounds which constitute my invention can be represented by the structural formula

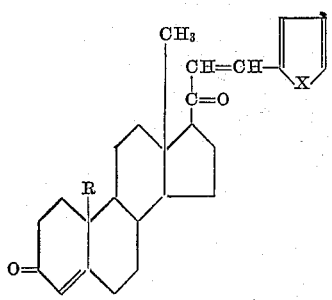

wherein X is a non-metallic element of periodic group VI such as oxygen or sulfur and R is hydrogen or a methyl radical.

The compounds which constitute my invention are valuable hormonal agents. While they are structurally related to the naturally occurring hormone desoxycorticosterone, I have found that they antagonize some of the physiological actions of that hormone which limit its therapeutic utility. While desoxycorticosterone produces sodium retention, the compounds of my invention are sodiouretic agents. The compounds also are active anti-inflammatory agents in conditions such as iritis.

The compounds which constitute my invention are conveniently prepared by condensing 3-hydroxy-5-pregnen-20-one or the corresponding 19-nor compound with furfural or with thiophenecarbonal and submitting the resulting 5-pregnen-3-ol derivative to an Oppenauer oxidation. Alternatively a 3-alkoxy-3,5-pregnadien-20-one or the corresponding 19-nor compound is condensed with furfural or with thiophenecarbonal after which the enol ether is hydrolyzed to yield the 4-pregnen-3-one.

The following examples illustrate in further detail some of the compounds which constitute my invention and methods for their synthesis. However, my invention is not to be construed as limited in spirit or in scope by the details set forth therein, since it will be apparent to those skilled in the art that numerous modifications in materials and in methods can be adopted without departing from the invention in spirit or in scope. In these examples, quantities are indicated in parts by weight and temperatures in degrees centigrade.

This application is a continuation-in-part of my copending application Serial No. 440,272, filed June 29, 1954, now abandoned.

*Example 1*

A mixture of 632 parts of 3-hydroxy-5-pregnen-20-one, 384 parts of furfural and 8000 parts of ethanol is warmed to effect solution. Then, 200 parts of sodium in 2800 parts of methanol are added. The mixture is permitted to stand for 12 hours at room temperature, after which it is warmed to 50° C. It is then diluted with water until crystallization starts. The precipitate is collected on a filter, washed with 50% methanol, and crystallized repeatedly from dilute methanol and then from dilute acetone using charcoal decolorization during one of these recrystallizations. The 21-furfurylidene-3-hydroxy-5-pregnen-20-one thus obtained melts at about 99–100.5° C.

From a mixture of 3 parts of 21-furfurylidene-3-hydroxy-5-pregnen-20-one, 87 parts of toluene and 30 parts of cyclohexanone, 55 parts are distilled off to insure dryness. A solution of 3 parts of aluminum isopropylate in 13 parts of toluene is added and the mixture is heated for 20 minutes. It is then poured into 100 parts of a saturated Rochelle salt solution and the organic solvent is removed by steam distillation. The remaining precipitate is collected on a filter and recrystallized repeatedly from dilute methanol and from dilute acetone. On heating the 21-furfurylideneprogesterone thus obtained melts at about 154–157° C., resolidifies and melts again at about 167–168° C. The optical rotation of a 1% chloroform solution is $[\alpha]_D^{25} = +217°$. The ultraviolet absorption spectrum shows a maximum at 241 millimicrons with a molecular extinction coefficient of 19,800 and a maximum at 320 millimicrons with a molecular extinction coefficient of 25,700. The compound has the structural formula

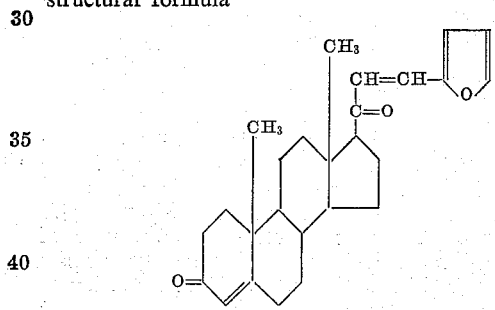

An alternate purification procedure leads to the isolation of two isomers. The crude 21-furfurylideneprogesterone is not crystallized but is taken up in a benzene solution and applied to a silica gel chromatography column. The column is washed with benzene and then eluted with a 5% solution of ethyl acetate in benzene. The first eluates yield on concentration the isomer described above melting at about 170.5–171.5° C., the optical rotation of a 1% chloroform solution being $$[\alpha]_D^{25} = +225°$$

Later fractions eluted with a 5% solution of ethyl acetate in benzene contain an isomer which, recrystallized from dilute acetone, melts at 208–209° C. The optical rotation of a 1% chloroform solution is $[\alpha]_D^{25} = +281.5°$.

*Example 2*

To a solution of 100 parts of 19-norprogesterone in 570 parts of purified dioxane are added 90 parts of the triethyl ester of orthoformic acid. The mixture is cooled to 10.5° C. Then a solution of 2.44 parts of p-toluenesulfonic acid monohydrate in 280 parts of pure dioxane and 0.1 part of ethanol are added and the mixture is permitted to stand at room temperature for an hour. The red solution is treated with 50 parts of potassium hydroxide in 500 parts of water, then poured into water, and scratched until crystalline and filtered. The 3-ethoxy-19-nor-3,5-pregnadien-20-one collected on the filter is dissolved in a solution of 30 parts of sodium in 1200 parts of ethanol. Then 70 parts of furfural are added and the mixture is permitted to stand for 15 hours, diluted with water and extracted with ether. The extract is dried over anhydrous sodium sulfate, filtered and evaporated and the residue is warmed on the steam bath for 30 minutes with 630 parts of glacial acetic acid in 200 parts of water. After dilution with water, the reaction mixture is scratched until a crystalline precipitate is formed. The latter is collected on a filter and recrystallized repeatedly from a mixture of dilute acetone and dilute methanol, charcoal decolorization being used during one of the crystallizations. One thus obtains the 21-furfurylidene-19-norprogesterone which has the structural formula

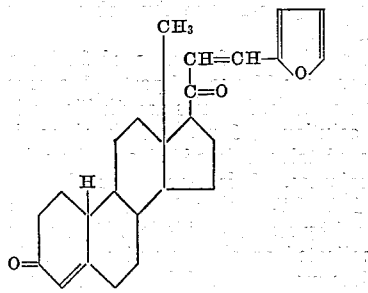

The ultraviolet absorption spectrum shows maxima at about 241 and 320 millimicrons with molecular extinction coefficients of approximately 20,000 and 25,800.

*Example 3*

A solution of 50 parts of sodium in 700 parts of methanol is added to a mixture consisting of 158 parts of 3-hydroxy-5-pregnen-20-one, 112 parts of 2-thiophene-carbonal and 2500 parts of ethanol. After standing at room temperature for 24 hours, the reaction mixture is heated to about 60° C. and then diluted with water to induce crystallization. After cooling, the precipitate is collected on a filter and recrystallized repeatedly from dilute methanol and from dilute acetone, charcoal decolorization being used during one of these recrystallizations. The 21-thenylidene-3-hydroxy-5-pregnen-20-one thus obtained melts at about 123–125° C.

A mixture of 75 parts of 21-thenylidene-3-hydroxy-5-pregnen-20-one, 2200 parts of toluene and 750 parts of cyclohexanone is distilled until approximately one-half of the volume has been evaporated. Then a solution of 72 parts of aluminum isopropylate in 320 parts of toluene is added. The mixture is heated for 20 minutes at reflux temperature, poured into 2500 parts of saturated potassium sodium tartrate solution and steam distilled until all of the organic solvents have been removed. The crystalline precipitate is collected on a filter and recrystallized repeatedly from dilute methanol solution. The infrared absorption spectrum shows maxima at 5.98, 6.02 and 9.02 microns. The compound has the structural formula

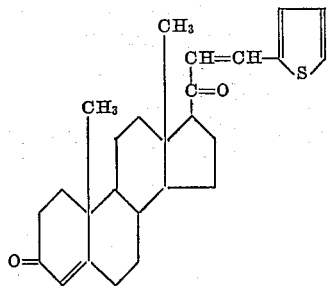

*Example 4*

The ethyl enol ether obtained from 100 parts of 19-norprogesterone by the method of Example 2 is dissolved in a solution of 30 parts of sodium and 1200 parts of ethanol and then treated with 82 parts of 2-thiophene-carbonal. After standing at room temperature for 5 hours, the reaction mixture is diluted with water and extracted with ether. This extract is dried over anhydrous calcium sulfate, filtered and evaporated. The residue is heated at 80° C. for 20 minutes with 620 parts of glacial acetic and 200 parts of water. The reaction mixture is then diluted with water and chilled until crystallization occurs. The residue is repeatedly recrystallized from a mixture of dilute acetone and dilute methanol with charcoal clarification. One thus obtains 21-thenylidene-19-norprogesterone which has the structural formula

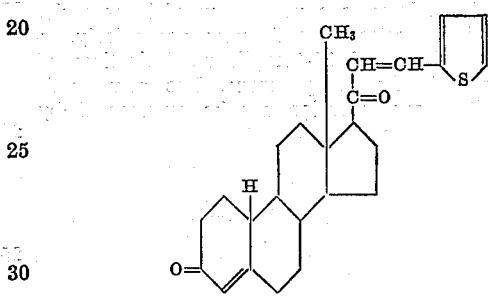

Infrared absorption maxima are observed at about 5.98, 6.03 and 9.02 microns.

What is claimed is:
1. A compound of the structural formula

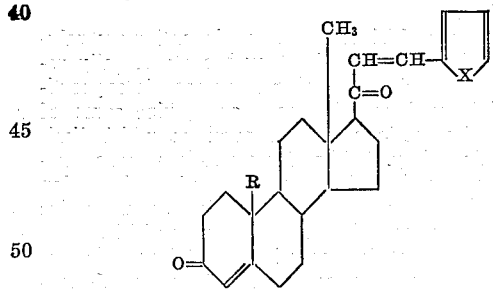

wherein X is a member of the class consisting of oxygen and sulfur and R is a member of the class consisting of hydrogen and methyl radicals.
2. 21-furfurylideneprogesterone.
3. 21-furfurylidene-19-norprogesterone.
4. 21-thenylideneprogesterone.
5. 21-thenylidene-19-norprogesterone.

References Cited in the file of this patent

UNITED STATES PATENTS 2,470,903   Ross _____ May 24, 1949
2,656,348   Miescher _____ Oct. 20, 1953